United States Patent
Liu et al.

(10) Patent No.: US 9,504,022 B2
(45) Date of Patent: Nov. 22, 2016

(54) METHODS AND DEVICES FOR CONFIGURING USER EQUIPMENTS WITH MULTIPLE TRANSMIT ANTENNAS

(75) Inventors: Jinhua Liu, Beijing (CN); Johan Hultell, Solna (SE);
(Continued)

(73) Assignee: TELEFONAKTIEBOLAGET L M ERICSSON, Stockholm (SE)

(*) Notice: Subject to any disclaimer, the term of this patent is extended or adjusted under 35 U.S.C. 154(b) by 815 days.

(21) Appl. No.: 13/703,458

(22) PCT Filed: Jun. 29, 2011

(86) PCT No.: PCT/SE2011/050872
§ 371 (c)(1),
(2), (4) Date: Dec. 11, 2012

(87) PCT Pub. No.: WO2012/002895
PCT Pub. Date: Jan. 5, 2012

(65) Prior Publication Data
US 2013/0094477 A1 Apr. 18, 2013

Related U.S. Application Data

(60) Provisional application No. 61/359,900, filed on Jun. 30, 2010.

(51) Int. Cl.
*H04W 72/04* (2009.01)
*H04B 7/02* (2006.01)
(Continued)

(52) U.S. Cl.
CPC ......... *H04W 72/0413* (2013.01); *H04B 7/022* (2013.01); *H04B 7/0404* (2013.01);
(Continued)

(58) Field of Classification Search
CPC ................ H04B 7/022; H04B 7/0404; H04W 52/146; H04W 72/0413
See application file for complete search history.

(56) References Cited

U.S. PATENT DOCUMENTS 7,929,510 B2*  4/2011  Dominique ........... H04L 25/067
                                                370/329
2006/0199577 A1*  9/2006  Ramakrishna ......... H04B 1/707
                                                455/422.1
(Continued)

FOREIGN PATENT DOCUMENTS

WO    2004/102832 A1    11/2004

OTHER PUBLICATIONS

3rd Generation Partnership Project. "Comparison of UL CLTD Pilot Channel Structures." 3GPP TSG-RAN WG1 Meeting #63bis, R1-110265, Dublin, Ireland, Jan. 17-21, 2011.
(Continued)

*Primary Examiner* — Xavier S. Wong
(74) *Attorney, Agent, or Firm* — Patents on Demand, P.A.; Brian K. Buchheit; Scott M. Garrett (57) ABSTRACT

In deployments where there is a mixture of new Node Bs capable of uplink multi-antenna transmission and legacy Node Bs not capable of uplink multi-antenna transmission some embodiments described herein enable a network node (e.g. a radio network controller, RNC) to configure an uplink control channel (e.g. dedicated physical control channel, DPCCH) to be decodable by both the new and the legacy Node 8s when the UE operates in uplink multi-antenna transmission.

5 Claims, 3 Drawing Sheets

(75) Inventors: Muhammad Kazmi, Bromma (SE);
Qingyu Miao, Beijing (CN)

(51) Int. Cl.
*H04B 7/04* (2006.01)
*H04B 7/06* (2006.01)
*H04W 36/18* (2009.01)
*H04W 52/40* (2009.01)
*H04W 88/10* (2009.01)
*H04W 92/12* (2009.01)

(52) U.S. Cl.
CPC ........... *H04B 7/0417* (2013.01); *H04B 7/0617* (2013.01); *H04W 36/18* (2013.01); *H04W 52/40* (2013.01); *H04W 88/10* (2013.01); *H04W 92/12* (2013.01)

(56) References Cited

U.S. PATENT DOCUMENTS

| | | | | |
|---|---|---|---|---|
| 2009/0135769 | A1* | 5/2009 | Sambhwani | H04L 5/0053 370/329 |
| 2011/0051692 | A1* | 3/2011 | Sambhwani | H04W 36/0072 370/332 |
| 2011/0096815 | A1* | 4/2011 | Shin | H04B 7/0689 375/219 |
| 2012/0069812 | A1* | 3/2012 | Noh | H04L 5/0091 370/329 |
| 2012/0122407 | A1* | 5/2012 | Allpress | H04B 7/0623 455/67.11 |

OTHER PUBLICATIONS

3rd Generation Partnership Project. "Concept of UL Closed Loop Transmit Diversity." 3GPP TSG-RAN WG1 Meeting #61, R1-102931, Montreal, Canada, May 10-14, 2010.

Generation Partnership Project. "Considerations on HS-DPCCH design for 4C-HSDPA." 3GPP TSG-RAN WG1 Meeting #61, R1-102922, Montreal, Canada, May 10-14, 2010.

3rd Generation Partnership Project. "UL Multiple Antenna Transmission for LTE Core Part." 3GPP™ Work Item Description, RP-091430.

3rd Generation Partnership Project. 3GPP TR 25.863 V10.0.0 (Jul. 2010). 3rd Generation Partnership Project; Technical Specification Group Radio Access Network; Universal Terrestrial Radio Access (UTRA); Uplink transmit diversity for High Speed Packet Access (HSPA) (Release 10). Jul. 2010. pp. 1-19.

* cited by examiner

METHODS AND DEVICES FOR CONFIGURING USER EQUIPMENTS WITH MULTIPLE TRANSMIT ANTENNAS

TECHNICAL FIELD

The present invention relates to methods and devices for configuring user equipments (UEs) with multiple transmit antennas.

BACKGROUND

Multiple-antenna technology is widely used in the wireless communication systems. For Long Term Evolution (LTE), Downlink (DL) Multiple Input Multiple Output (MIMO) was standardized in Third Generation Partnership Project (3GPP) Release 8 (Rel-8). For Wideband Code Division Multiple Access High Speed Packet Access (WCDMA-HSPA) evolution, downlink 2 by 2 MIMO was specified in 3GPP Rel-7. The introduction of uplink multiple-antenna technology is being discussed in 3GPP, including Uplink Transmit Diversity (ULTD) in WCDMA and uplink (UL) MIMO in LTE. With ULTD or UL MIMO, there will be at least 2 transmit (TX) antennas in the UE.

Two well-known examples of ULTD that have been studied, e.g., within Rel-10 scope of 3GPP for WCDMA/HSPA, are Switch Antenna Transmit Diversity (SATD) and Beam Forming Transmit Diversity (BFTD). SATD and BFTD are here used as examples for illustration purpose only. For SATD, the UE transmits from one of its antennas, e.g., the TX antenna associated with the stronger channel (i.e. better estimated uplink quality). This can be estimated in a distributed fashion by the UE from the received UL TPC command sent by the base station. For BFTD, the UE transmits from both TX antennas with an estimated complex-valued weight factor (sometimes also referred to as pre-coding vector) to maximize received power or Signal to Interference plus Noise Ratio (SINR) at the radio base station/Node B, receiver, referred to as NodeB herein. The ULTD technology can improve the system capacity and coverage and save the UE battery consumption in most cases. There are two types of ULTD modes, Open Loop ULTD (OLTD) and Closed Loop ULTD (CLTD). In the latter case there is a specific downlink feedback channel from one or more Node Bs to the UE carrying the pre-coding vector or the information to assist the generation of pre-coding vectors. For OLTD, there is no specific downlink feedback channel from the Node B to the UE to signal the pre-coding information. For CLTD, in order for the Node B to generate the desired pre-coding information to the UE over the specific downlink feedback channel, the Node B should also monitor the uplink channels. In existing systems the pre-coding vector is typically generated in the Node B and sent to the UE. Alternatively the Node B can also send only channel state information to the UE, which in turn autonomously can decide the suitable pre-coding vector.

OLTD for WCDMA-HSPA

For WCDMA/HSPA, OLTD has been studied within the Rel-10 time frame in 3GPP. The UE performs transmit adaptation of the 2 transmit antennas based on the already existing information, e.g. the TPC commands. Examples of algorithms for open loop SATO and for open loop BF are described in 3GPP TR 25.863, "Uplink Tx Diversity for HSPA Study Item Technical Report".

In case of SATO, there are typically two or more TX antennas and one single full-power power amplifier in the UE. With the scheme described in 3GPP TR 25.863, "Uplink Tx Diversity for HSPA Study Item Technical Report", the UE selects the TX antenna according to the TPC statistic in accordance with:

1) Let TPC command DOWN be represented by −1 and TPC command UP by +1. Then let the UE accumulate all received TPC commands.
2) At each frame border the accumulated TPC sum is compared with 0. If the sum is larger than 0 the transmit antenna is switched.
3) If the same transmit antenna has been used for a number x consecutive frames the UE automatically switches antenna. The number x can be referred as the forced switch circle and determined according to the radio environments.
4) Every time an antenna switch occurs the accumulated TPC sum is reset to 0.

In case of BFTD, there are two power amplifiers in the UE. With the algorithm described in TR 25.863, "Uplink Tx Diversity for HSPA Study Item Technical Report" the UE adjusts the beam by adjusting the relative phase difference between the two antennas based on the received TPC commands:

A. The phase offset, $\delta$, can be 48 degrees, $\epsilon$ can be 12 degrees.
B. Let TPC command DOWN be represented by −1 and TPC command UP by +1.
  1. Initial relative phase between two transmitters $\Delta\phi=-\delta/2$ for the first slot (#1 slot). $\epsilon$ is kept zero until two TPC commands become available to the UE.
  2. Apply relative phase for the next slot $\Delta\phi=\Delta\phi+\delta$
  3. Determine new relative phase:
    a. if TPC1>TPC2, $\Delta\phi=\Delta\phi+\epsilon$
    b. if TPC2>TPC1, $\Delta\phi=\Delta\phi-\epsilon$
    c. otherwise, no change
    Note that TPC1 and TPC2 correspond to slot (1,2), (3,4), . . . (i*2−1, i*2), where i=1 to n.
  4. Apply relative phase for the next slot $\Delta\phi=\Delta\phi-\delta$
  5. Go to step 2

A UL OLTD capable UE can in principle be configured in default mode (fixed single TX antenna transmission), OLTD mode (open loop SAID and/or BFTD). The OLTD mode can be supported by a cell belonging to a legacy, Node B.

CLTD in HSPA

CLTD was proposed in 3GPP RAN1-61 meeting, see 3GPP R1-102931, "Concept of UL Closed Loop Transmit Diversity", Huawei. In this paper, the uplink closed loop transmit diversity scheme is based on explicit uplink channel estimation and Channel Status Information (CSI) feedback. Thus, the network controls the UE behavior and decides the weights (pre-coding vector) applied by the UE at a given time, Simulation results show that the average throughput gain reaches 14% in Pedestrian A channel (3 km/h) and up to 10% in Vehicular A (30 km/h) channel. Overall CLTD can thus be a feature that can be further considered for improving the HSPA uplink. As a matter of fact CLTD is being standardized by 3GPP in Rel-11 of WCDMA/HSPA.

A UL CLTD UE can be configured in default TX antenna mode, open loop BFTD Mode and closed loop BFTD mode. The first two TX antenna modes can be supported by legacy Node Bs. The last TX antenna mode (closed loop BFTD) may however not be supported by a cell belonging to a legacy Node B since, e.g., a new feedback channel needs to be implemented at the Node-B side. The UE can also be configured to use open loop or closed loop SATD mode if there is a full-power power amplifier in the UE or if the UE is not power limited even though it uses a half-power power amplifier. The active cells, i.e. the cells to which a UE is connected, belonging to the legacy Node Bs can correctly receive the data from the UEs in open loop or closed loop SATD mode.

UL MIMO in HSPA

For LTE, UL MIMO comprising of up to 4 transmit antennas in the UE is being specified, see RP-091430, UL multiple antenna transmission for LTE, work item, RAN#46. For WCDMA-HSPA, UL MIMO is a natural extension to UL beam-forming since UE that support BFTD will be equipped with transmit chains and there thus is not any hardware update for ULBF UE to support UL MIMO. In current WCDMA-HSPA Node B, there are typically two receive antennas. In future deployments, there can be additional receive antennas and more advanced receiver structures, This means that there can be even larger gain from UL MIMO in future deployments. For instance, advanced receivers such as enhanced receiver Type 3i and interference cancellation technology can be used in the Node B side when the related cost is decreased to an acceptable level.

A UL MIMO capable UE can be configured in default single TX antenna mode, open loop BFTD Mode, closed loop BFTD mode and UL MIMO mode. Among these modes, the first two TX antenna modes (single Tx and open loop TD) can be supported by all Node Bs. But the last two TX antenna modes cannot be supported by a cell associated with a legacy Node B. Just as a CLTD capable UE, the UL MIMO capable UE is likely to be configurable to operate in either open loop or closed loop SATD mode partly depending upon the UE implementation. For instance the UL MIMO capable UE may operate in SATD modes if it has a full-power power amplifier or if its power is not limited even when using a half-power power amplifier.

Deployment of UL MIMO and/or CLTD Capable Node B

A "universal" deployment of UL MIMO and/or CLTD capable Node Bs (also referred as new Node Bs hereinafter) can take a long time. For instance, new Node Bs may initially only be deployed in some hotspot or coverage limited areas where MIMO or BFTD technology is capable of providing significant capacity and/or coverage improvements, respectively. In such partial deployment scenarios the new Node Bs will be surrounded by legacy Node Bs, which cannot support UL MIMO or some CLTD transmissions. Furthermore, new Node Bs are likely to be deployed in areas where there is a need for a substantial performance improvement and/or need for higher capacity. Hence, partial deployment scenarios comprising of the mixture of the legacy Node B and new Node B (e.g. UL MIMO capable Node B:s) are also likely to exist at later stages.

Figure 1:
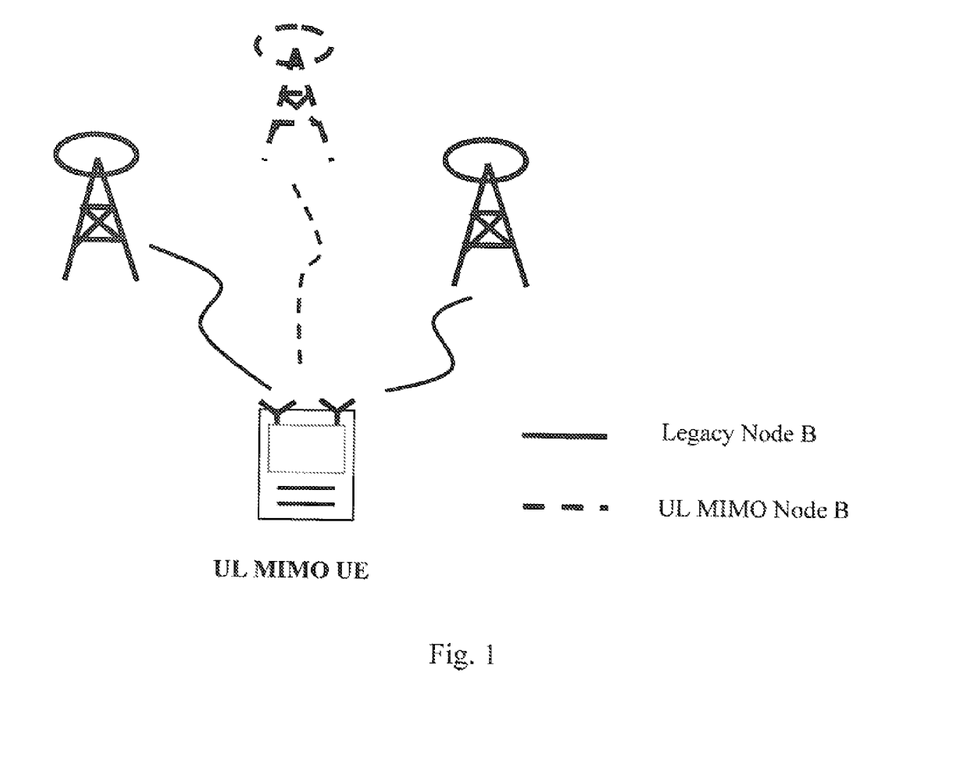
FIG. 1 is a view illustrating a cellular radio system having radio base stations supporting uplink multi antenna transmission, such as UL MIMO or uplink CL BFTD, in some but not all cells.

A UE located in an area with mixed Node Bs (legacy Node Bs and New Node Bs) may be in soft handover with new and legacy Node B:s. This type of mixed deployment scenario with a UE in soft handover with new and legacy Node Bs is illustrated in FIG. 1. In summary, there can be mixture of new Node Bs, i.e. Node Bs capable of decoding uplink multi-antenna transmission with a new control channel format such as UL MIMO or some UL CLTD and legacy Node Bs, i.e. Node Bs not capable of such decoding in some border areas.

In such scenarios several problems can occur. For instance,

A legacy Node B may not be capable of receiving data streams from a UE configured in UL MIMO or some CLTD mode.

There is no soft handover gain from the cell in the active set that belongs to the legacy Node Bs for a UE configured in UL MIMO or some CLTD mode.

The handover from a cell belonging to a new Node B to a cell belonging to a legacy Node B of a UE in UL MIMO or some CLTD mode should be smooth and seamless A legacy Node B may not be able to control the transmit it power of the UE (if it cannot be part of the active set for a UE configured in SHO) by means of the overload indicator (transmitted over the relative grant channel). This may result in the undesirable event that an UL MIMO UE causes a severe interference level at the legacy Node-B.

Hence, there exist a need for new methods and devices providing improved performance in cellular radio systems with MIMO in the uplink.

SUMMARY

It is an object of the present invention to provide improved methods and devices to address at least some of the problems as outlined above.

This object and others are obtained by the methods and devices as set out in the appended claims.

This in deployments where there is a mixture of new Node Bs and legacy Node Bs some embodiments described herein enable a network node (e.g. a radio network controller, RNC) to configure an uplink control channel (e.g. dedicated physical control channel, DPCCH) so that it is decodable by both the new and the legacy Node Bs involved in Soft Handover (SHO) when the UE operates in an uplink multi-antenna transmission mode such as UL MIMO or some UL CLTD (in particular uplink CL BFTD) mode.

Further, some embodiments described herein enable a network node (e.g. RNC) to configure the UE in a Transmit (Tx) antenna mode, which is at least supported by the:

Serving E-DCH (enhanced dedicated channel) cell or

Serving E-DCH cell and some non-serving E-DCH cells, which also ensures better system performance based on suitable criteria.

Some embodiments described herein enable a UE operating in UL MIMO or some LTD mode to handle the UL TPC commands received from the cells belonging to the legacy Node Bs involved in SHO. The UE behavior of handling the UL TPC, which for example can comprise ignoring TPC from legacy Node Bs is determined by:

a pre-defined rule or a rule configured by a network node (e.g. RNC)

In accordance with some embodiments of a first aspect a method in a radio network controller of a wideband code division multiple access (WCDMA) radio system is provided. The radio system comprising a mixture of radio base stations of a first type that are capable of decoding transmissions in a first control channel format in an uplink multi-antenna transmission from a user equipment (UE) and radio base stations of a second type that are not capable of decoding transmissions in said first control channel format in an uplink multi-antenna transmission from the UE. The UE is connected to an active set of cells. The method comprises configuring uplink transmission of at least one transmit antenna of the UE to use a second control channel format that can be decoded by both said radio base stations of first and second type, when a cell belonging to a radio base station of the second type is added into the active set of the UE. Hereby an improved soft handover for an uplink multi-antenna transmission capable UEs in a deployment comprising a mixture of new Node Bs and legacy Node Bs can be obtained.

In accordance with one embodiment the radio network controller notifies the UE when a radio link is set up about what cell(s) in the active set of the UE belong to a radio base station of the second type.

In accordance with some embodiments the uplink multi-antenna transmission is uplink Multiple Input Multiple Output or uplink closed loop Beam Forming Transmit Diversity.

In accordance with one embodiment the radio network controller configures a radio base station of the second type to not transmit UL Transmission Power Control, TPC, commands to a UE operating in UL MIMO or uplink closed loop Beam Forming Transmit Diversity mode.

In accordance with one embodiment the control channel is a dedicated physical control channel.

In accordance with some embodiments of a second aspect a method in a user equipment (UE) having at least two transmit antennas and being capable of uplink multi-antenna transmission is provided. The UE is connected to an active set of cells, wherein the active set can comprise a mixture of radio base stations of a first type that are capable of decoding transmissions in a first control channel format in an uplink multi-antenna transmission from the UE and radio base stations of a second type that are not capable of decoding transmissions in said first control channel format in an uplink multi-antenna transmission from the UE. The method comprises the receiving at least one control signal where the at least one control signal controls uplink transmission of at least one of the transmit antennas of the UE to use a second control channel format that can be decoded by both said radio base stations of first and second type.

In accordance with one embodiment the UE is configured to ignore uplink Transmission Power Control, TPC, commands received from cells of the active set belonging to a radio base station of the second type.

In accordance with one embodiment the UE is configured to determine whether a radio base station of cell of the active set is of the first or second type by determining the missing uplink multi-antenna transmission control information sent on the downlink.

In accordance with one embodiment the uplink multi-antenna transmission is uplink Multiple Input Multiple Output or uplink Closed Loop Transmission Diversity. The uplink Closed Loop Transmission Diversity can in particular be uplink closed loop Beam Forming Transmit Diversity.

In accordance with one embodiment the control channel dedicated physical control channel.

In accordance with one embodiment the UE in response to receiving said at least one control signal configures uplink transmission of at least one transmit antenna of the UE to use the second control channel format that can be decoded by both said radio base stations of first and second type and continuing transmitting data using an enhanced dedicated channel, E-DCH, format associated with the multi-antenna transmission mode which base stations of the first type are capable of decoding but base stations of the second type are incapable of decoding.

Thus, the UE is configured to transmit data using an enhanced dedicated channel, E-DCH, format associated with the multi-antenna transmission mode which base stations of the first type are capable of decoding but base stations of the second type are incapable of decoding. The UE in response to receiving the at least one control signal configuring uplink transmission of at least one transmit antenna of the UE starts to use the second control channel format that can be decoded by both said radio base stations of first and second type but continues to transmit data using an enhanced dedicated channel, E-DCH, format associated with the multi-antenna transmission mode which base stations of the first type are capable of decoding but base stations of the second type are incapable of decoding.

The invention also extends to a radio network node such an RNC and a user equipment arranged to perform the above methods. The radio network node and the user equipment can be provided with a controller/controller circuitry for performing the above methods. The controller(s) can be implemented using suitable hardware and or software. The hardware can comprise one or many processors that can be arranged to execute software stored in a readable storage media. The processor(s) can be implemented by a single dedicated processor, by a single shared processor, or by a plurality of individual processors, some of which may be shared or distributed. Moreover, a processor or controller may include, without limitation, digital signal processor (DSP) hardware, ASIC hardware, read only memory (ROM), random access memory (RAM), and/or other storage media.

BRIEF DESCRIPTION OF THE DRAWINGS

The present invention will now be described in more detail by way of non-limiting examples and with reference to the accompanying drawing, in which.

DETAILED DESCRIPTION

In the below exemplary description, it is assumed that there are 2 transmit (TX) antennas in the user equipment. The invention is however not limited to such a UE and can also be implemented for UEs configured for any type of multi-antenna transmission. Thus, there can be 3 or more TX antennas or for UL MIMO beyond (2×2) antenna configuration.

Figure 2:
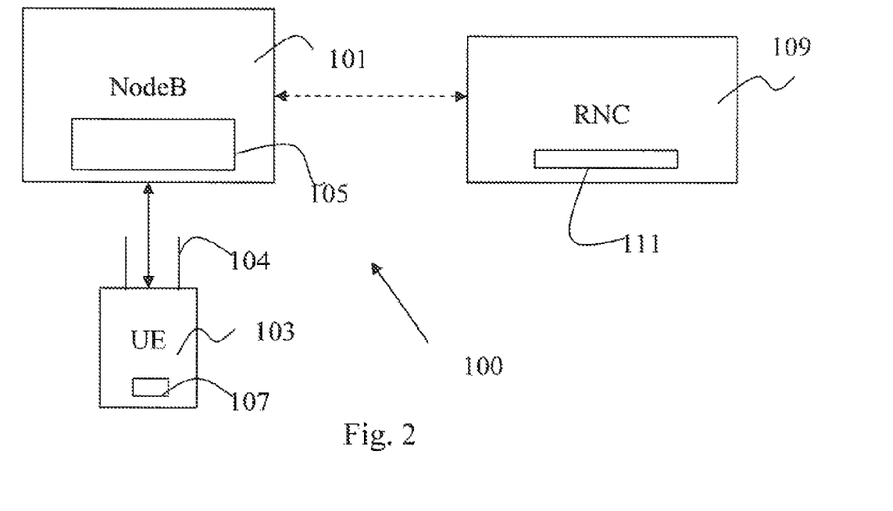
FIG. 2 is a general view of a cellular radio system

In FIG. 2 a general view of a cellular radio system 100 is depicted. The system 100 depicted in FIG. 1 is a UTRAN system. However it is also envisaged that the system can be an E-UTRAN system or another similar systems. The system 100 comprises a number of radio base stations 101, whereof only one is shown for reasons of simplicity. The radio base station 101 can be connected to by user equipments in the figure represented by the UE 103 located in the area served by the base station 101. The UE 103 comprises at least two transmit antennas 104 enabling the UE 103 for uplink multi-antenna transmission in the uplink such as MIMO transmission or CLTD (in particular uplink CL BFTD). The base station 101 and the user equipment 103 further comprise controllers/controller circuitry 105 and 107 for providing functionality associated with the respective entities. The controllers 105 and 107 can for example comprise suitable hardware and or software.

The radio base station 101 can further be connected to a central network node, here represented by a Radio Network Controller 109. The network node 109 also comprise controllers/controller circuitry 111 for providing functionality associated with the network node 109. The controller 111 can for example comprise suitable hardware and or software.

The hardware referred to above can comprise one or many processors that can be arranged to execute software stored in a readable storage media. The processor(s) can be implemented by a single dedicated processor, by a single shared processor, or by a plurality of individual processors, some of which may be shared or distributed. Moreover, a processor may include, without limitation, digital signal processor (DSP) hardware, ASIC hardware, read only memory (ROM), random access memory (RAM), and/or other storage media.

In a cellular radio system with a mixture of radio base stations that are capable of decoding uplink multi-antenna transmission such as UL MIMO or uplink closed loop Beam Forming Transmit Diversity, involving a new control channel format (new radio base station) and of radio base stations that are not capable of such uplink multi-antenna transmission (legacy radio base stations) embodiments described herein will improve the system performance. Embodiments described below can be divided into the following headings:

Fallback Mode Configuration by RNC
Conditional Configuration of Transmit Antenna Mode by RNC
Antenna Configuration by RNC while Serving cell Transition
Control Channel Configuration by RNC
UE Behavior of Handling Power Control Command from Legacy Node B It should however be noted that an embodiment described under a particular heading does not exclude the use of another embodiment described under another heading. Thus, embodiments described under different headings can in some instances be used together. For example "Control Channel Configuration by RNC" and "UE Behavior of Handling Power Control Command from Legacy Node B" can in accordance with some embodiments be combined with each other and/or embodiments described under the heading "Conditional Configuration of Transmit Antenna Mode by RNC" or "Antenna Configuration by RNC while Serving cell Transition".

Figure 3:
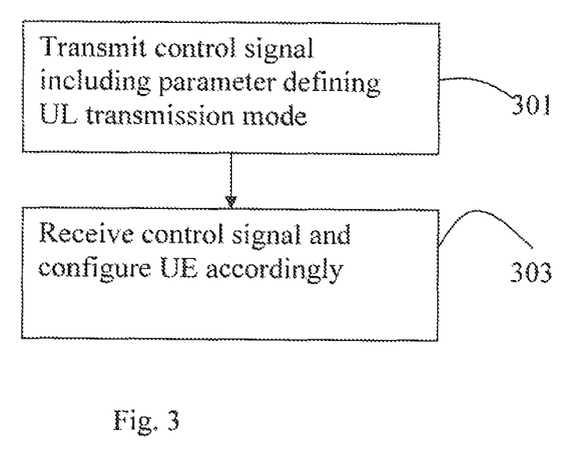
FIGS. 3 and 4 are flow charts depicting different steps performed when configuring the control channel of a UE.

In accordance with some embodiments the UE 103 has (at least) two transmit antennas 104 that can be used for uplink multi-antenna transmission such as uplink MIMO transmission or uplink closed loop Beam Forming Transmit Diversity. The network node, here represented by an RNC, configures uplink multi-antenna transmission operation of a UE by transmitting at least one control signal to the UE. The UE receives the at least one control signal and is configured to act in accordance with at least one parameter included in the control signal, where the at least one parameter defines the mode of operation being configured in the UE by the RNC. This is illustrated in FIG. 3. In FIG. 3 a flowchart illustrating some steps performed when configuring a UE comprising at least two transmit antennas is shown. First in a step 301 a radio network node transmits at least one control signal to the UE. The at least one control signal comprises at least one parameter that defines the transmission mode for uplink multi-antenna transmission (such as uplink MIMO transmission and or uplink closed loop Beam Forming Transmit Diversity) for the UE. In accordance with some embodiments the step 301 comprises configuring a radio link between the UE and the radio base station that is not capable of receiving uplink multi-antenna transmission from the UE to use a DPCCH in the uplink when a radio base station that is not capable of receiving uplink multi-antenna transmission from the UE is added to the active set of the UE. The DPCCH is decodable by the radio base station that is not capable of receiving uplink multi-antenna transmission from the UE. Next, in a step 303, the UE receives the at least one control signal and the UE is configured for uplink multi-antenna transmission (such as uplink MIMO or uplink closed loop Beam Forming Transmit Diversity) in accordance with the at least one parameter of the at least one control signal. In accordance with some embodiments the step 303 comprises configuring the UE to use a DPCCH in the uplink to a radio base station that is not capable of receiving uplink multi-antenna transmission from the UE.

Fallback Mode Configuration

In some embodiments the RNC always configure the UL MIMO UE to OLTD or default mode when it adds a cell belonging to a legacy Node B into the active cell set (ACS). In such an embodiment the UL MIMO or some LTD capability of the cell belonging to new Node Bs is not utilized. However, this ensures that the receiver of cells belonging to a legacy Node B is utilized for receiving the data/control information transmitted from the UE. Thus the UE will be able to fully benefit from the soft handover (SHO) gain. The non-serving Node Bs will always be able to control the transmit power of the UE by means of the overload indicator signaled over the E-DCH Relative Grant Channel (E-RGCH) channel, Consequently the performance for UE doing the serving cell change (i.e. the HS-DSCH serving cell is changed to a new target cell) will be more robust. This is because the non-serving (i.e. the target cell) will have an accurate estimate of the channel and finger positions, which are necessary for example decoding the HS-DPCCH (i.e. the UL control channel carrying HARQ feedback and CQI). Clearly this method may not be optimal in all scenarios. This configuration would (i) be a rule implemented in by the standard or (ii) something implemented in a product (i.e. not required by the standard). If implemented by the standard then it is not unlikely that the standard (e.g., RRC specifications 25.331) could require that the RNC configures the UE in a certain mode when it is in SHO.

Conditional Configuration of Transmit Antenna Mode

In some embodiments, a UL MIMO or CLTD capable UE is configured in a TX antenna mode that can be supported by the serving cell. The adaptation of a suitable Tx antenna mode can be performed in the UE by a network node (e.g. RNC) either during the transition of the serving cell or at any other suitable time.

The transmit antenna mode configuration principles will now be described in more detail for the following two main cases below:

Serving cell belongs to legacy Node B not supporting UL MIMO or CLTD
Serving cell belongs to new Node B supporting UL MIMO or CLTD Configuration Mode: Serving Cell Belongs to Legacy Node B In accordance with some embodiments, if the serving cell belongs to a legacy Node B but there are cells in the active set that belong to new Node Bs, the UE is kept by the RNC in the OLTD or single TX antenna mode regardless of the number of the cells in the active set belonging to new Node Bs. This is because the serving cell should be able to correctly receive the higher layer signaling and other relevant information such as Radio Resource Control (RRC) signaling in the uplink. Also, there is information such as HS-DPCCH that only is decoded by the serving Node B and to ensure adequate downlink performance the serving Node B should always be able to perform accurate channel estimation and decode the related physical layer signaling such as HARQ-ACKs and CQIs.

Configuration Mode: Serving Cell Belongs to New Node B

On the other hand if the serving cell belongs to a new Node B, the UE can be configured by the RNC in any of the TX antenna modes supported by the UE. AU the modes including legacy Tx antenna modes are supported by the new Node B. In some embodiments it is as before assumed that at least one of the non-serving radio links is connected to a legacy Node B. Otherwise, if all radio links belong to the new Node B then more advanced scheme e.g. UL MIMO or CLTD can be configured.

Two methods for the RNC to select the transmit antenna mode when the serving cell and the corresponding radio link belong to the new Node B will now be described:

Default Tx Mode selection scheme

Advanced Tx Mode selection scheme

Both these actions are performed by the RNC i.e. configured by the RNC in the UE.

Default Tx Mode Selection Scheme

A default Tx antenna mode can be defined for the serving cell when the serving cell belongs to a new Node B. The default Tx antenna mode can be any of the modes: CLTD, single Tx antenna mode, UL MIMO or CLTD, etc. Then regardless of the system performance, UEs in SHO are always configured to the default Tx antenna mode (irrespectively of whether the non-serving cell belong to a legacy or a new Node B). For example if the default mode is CLTD then the UE is configured to the CLTD when the serving cell belongs to the new Node B. Alternatively a conservative approach can also be used by configuring the UE in a default mode regardless of the number of the remaining cells of the active set belonging to the legacy Node Bs. The default mode can be an OLTD mode.

In general the above approach is simple from a network implementation perspective. But this may not always be optimal from the system performance standpoint.

Advanced Tx Mode Selection Scheme

In this case it is assumed that there is no default or fixed Tx antenna mode. Rather the actual Tx antenna mode is configured depending upon the situation and input conditions with the aim of achieving better performance.

The aim is to configure the UE in a TX antenna mode that can maximize the UL performance. Assuming that the serving cell belongs to a new Node B, the RNC can conditionally configure the UE TX antenna mode of a UL MIMO/CLTD capable UE based on predefined rules when a cell belonging to a legacy Node B is added to the active set.

The method can be described as trading off the SHO gain from the cells of the active set belonging to legacy Node Bs and the gain from the UL MIMO or CLTD capability of cells of the active set belonging to new Node Bs. In general the comparison is based on measurements done at the Node B or by the UE or combination thereof. It is however to be noted that in some embodiments the information can be signaled from either the UE or the NodeB to the RNC via Radio Resource Control (RRC) or Node B Application Part (NBAP). Based on this comparison the UE TX antenna mode is configured to reach the best system performance.

Below are three examples of pre-defined rules to configure the UL TX antenna mode of a UE in UL MIMO/CLTD mode during SHO when the serving cell belongs to a new Node B:

EXAMPLE 1

Criteria Based on UL Quality

In accordance with some embodiments the RNC can configure the UE TX antenna mode based on uplink received quality, for example, DPCCH Signal to Interference plus Noise Ratio (SINR) and Physical channel BER, see TS 25.215-800, Physical layer-Measurements (FDD) (Release 8). These measurements are performed in both new and legacy Node Bs for uplink and reported to RNC. Thus, the RNC can configure the UE TX antenna mode based on the comparison of these measurements between the cells of the active set belonging to the new and legacy Node Bs according to a certain predetermined rule. In accordance with some embodiments the quality of best cell of the active set belonging to new Node Bs is compared to the best cell of the active set belonging to the legacy Node B.

---

For instance,
For a UL MIMO or CLTD capable UE in UL OLTD/single TX antenna mode,
   If ($SINR_{DPCCH,new} - SINR_{DPCCH,legacy} > Threshold_{up}$)
      Configure the UE to UL MIMO or CLTD mode;
   Else
      Keep the UE in UL OLTD/single TX antenna mode;
For a UL MIMO or CLTD capable UE in UL CLTD or MIMO mode,
   If ($SINR_{DPCCH,legacy} - SINR_{DPCCH,new} > Threshold_{down}$)
      Configure the UE to UL OLTD/single TX antenna mode
   Else
      Keep the UE in UL MIMO/CLTD mode

---

Where $SINR_{DPCCH,legacy}$ is (possibly filtered versions) the DPCCH SINR of the best cell of the active set belonging to legacy Node Bs, $SINR_{DPCCH,new}$ is the DPCCH SINR of the best cell of the active set belonging to new Node Bs, $Threshold_{up}$ is the DPCCH SINR threshold to up switch the UE TX antenna mode from UL OLTD/single TX antenna mode to UL MIMO/CLTD mode, $Threshold_{down}$ is the DPCCH SINR threshold to down switch the UE TX antenna mode from UL MIMO or CLTD mode to UL OLTD or single TX antenna mode.

EXAMPLE 2

Criteria Based on Data Block

When the UL MIMO or CLTD capable UE is already in OLTD or single TX antenna mode then:

The UE can be kept in this mode if a ratio R is lower than a predetermined threshold (H1)

Otherwise, if the ratio R is higher than another predetermined threshold (H2), the RNC can configure this UE in UL MIMO or CLTD mode to gain better system performance.

where the ratio R in accordance with some embodiments is defined as the ratio of the number of data blocks correctly received in the cells of the active set belonging to new Node Bs to the number of data blocks correctly received in the cells of the active set belonging to legacy Node Bs. Note that a high ratio R is an indication of that the UE mainly is power controlled by the serving Node-B (and consequently that the power measured by the non-serving Node-B is too small to successfully decode the data transmissions). In general any ratio R indicating if the UE is (mainly) power controlled by the serving NodeB can be used.

The first predetermined threshold (H1) can be lower than the second one (H2) in order to reduce ping-pang effects. Note also that the Ratio R can be a filtered versions of the ratio of successfully received packets by the serving Node-B.

EXAMPLE 3

Criteria Based on Data Rate

When the UE is already in UL MIMO or CLTD mode, the UE can be kept in this mode provided the following conditions are met:
The uplink data rate is above a predetermined threshold
The number of cells belonging to legacy Node-Bs in the active set is below threshold.
There are no strong cells in the active set belonging to legacy Node Bs (e.g. their number is lower than a predetermined threshold or received quality of each one is below threshold), so that considerable MIMO or CLTD gain is not achievable/expected.
The UE can be configured in an OLTD or single TX antenna mode provided:
There are strong enough cells in the active set belonging to legacy Node Bs (e.g. number of cells in the active set is higher than another predetermined threshold).
In accordance with some embodiments a rule is defined to use OLTD or single TX if a majority of cells in the active set are in legacy NodeBs.

Note also that this information could be made aware to the network (e.g., RNC) by reusing some of the existing Event 1x which is signaled to the RNC. Examples include that:
The measured CPICH power of the is below some absolute threshold,
The measured CPICH of the strongest cells associated with a legacy Node-B is more than a value x dB weaker than the CPICH power associated with the serving HS-DSCH cell.
Additionally, the Node-B could estimate the uplink path gain based on RSCP measurements and/or SIR measurement and signal this to the RNC.

Control Channel Configuration

According to some embodiments, when UE operates in uplink multi-antenna transmission mode such as UL MIMO or CLTD mode and transmits control signals and data signals which is decodable only by new NodeB and not a legacy NodeB and a cell belonging to a legacy NodeB is being added into the active set of the UE, the network node (e.g. RNC) sets up a radio link between the UE and the cell in the legacy Node B with a control channel, e.g. DPCCH for WCDMA, format that can be used by the cell in the legacy Node B. If the DPCCH formats on both TX antennas of the UE in UL MIMO/CLTD mode cannot be used by the cell in the legacy Node B, then the RNC changes the DPCCH format of at least one TX antenna (e.g. at the primary or the first TX antenna) of this UE to a legacy DPCCH format. This will enable the added cell with a legacy Node B to receive and decode the control channel from this TX antenna of the UE, which operates in UL MIMO/CLTD mode. In Soft Handover (SHO) more than one radio link is in operation. In the uplink the UE continues to transmit the same E-DCH over all the radio links involved in SHO. When operating in UL MIMO or CLTD mode the UE will send the data stream over the E-DCH, including control part: E-DCH Dedicated Physical Control Channel (E-DPCCH) and data part: E-DCH Dedicated Physical Data Channel (E-DPDCH), using the new format designed for the UL MIMO/CLTD. This means that a legacy Node B will not be able to receive the E-DCH from the UE in this scenario. This is because the new format of these channels may contain information specific to UL MIMO/CLTD. However, in accordance with some embodiments the legacy Node B is able to receive at least the basic control channel (e.g. DPCCH), which contains the fundamental information such as pilot signals and Transmit Power control (TPC) commands for the maintenance of the radio link.

Figure 4:
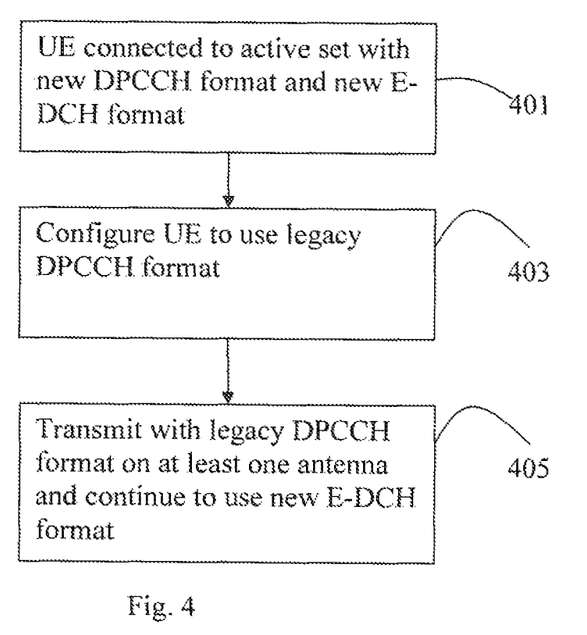

In FIG. 4 some steps that are performed in accordance with one exemplary embodiment in wideband code division multiple access (WCDMA) radio system is depicted to further illustrate configuring of a control channel is shown. The radio system comprises a mixture of radio base stations (new base station) of a first type that are capable of decoding transmissions in a first DPCCH format in an uplink multi-antenna transmission from a user equipment (UE) and radio base stations (legacy base station) of a second type that are not capable of decoding transmissions in the first DPCCH format in an uplink multi-antenna transmission from the UE. In the example in FIG. 4 the uplink multi-antenna transmission is uplink MIMO or uplink closed loop BFTD. Further the UE is configured for and performs the multi-antenna transmissions transmitting a data stream over E-DCH utilizing an E-DCH format associated with the uplink multi-antenna transmission (here termed new E-DCH format). The new E-DCH format used is thus decodable by the new base stations but not decodable by the legacy base stations.

First in a step 401 it is assumed that the UE is connected to an active set of cells and transmitting the DPCCH control channel using the first DPCCH format and data (user data and/or higher layer control data) using the new E-DCH format. Then in a step 403 the RNC configures uplink transmission of at least one transmit antenna of the UE to use a second DPCCH format that can be decoded by both the radio base stations of first and second type when a cell belonging to a radio base station of the second type is added to the active set of the UE. In an optional step the RNC first checks if the UE already is connected to a radio base station of the second type before configuring at least one transmit antenna of the UE to use the second DPCCH format that can be decoded by both the radio base stations of first and second type. If the UE already transmits in a DPCCH format decodable by a legacy base station there is no need to configure the UE again. The UE then in a step 405 is configured to use the DPCCH format decodable by the radio base stations of first and second type on at least one transmit antenna. The UE will continue to transmit data using the new E-DCH format. The legacy NodeB of the cell added to the active set will then receive UE uplink multi-antenna transmissions from the UE where transmissions include transmission of data with the new E-DCH format associated with the uplink multi-antenna transmission mode also after adding said cell to the active set. The data transmitted using the new E-DCH format cannot be decoded by the legacy NodeB, but since the DPCCH format is decodable the legacy Node B can receive at least the DPCCH control channel with info such as pilots and TPC commands. Hereby, an improved soft handover for an uplink multi-antenna transmission capable UEs in a deployment comprising a mixture of new Node Bs and legacy Node Bs can be obtained because the legacy NodeB can participate in the power control of the UE.

As stated above, even though the cells in the active set associated with a legacy Node B cannot receive and decode the data streams of a UE in Uplink (UL) MIMO or uplink CL BFTD mode, the control channel DPCCH is still decodable and hence the RNC can set the UL control channel DPCCH SINR target at the legacy cells. In this way the legacy Node B can also operate the outer loop power control. For example the RNC can adjust the control channel DPCCH SINR target for the legacy cells in the legacy Node B to ensure that a desired UL control channel DPCCH quality is met. The control channel DPCCH SINR target setting at the Node Bs by the RNC is done using existing methods. In case the UE operates in UL MIMO or UL CL BFTD then the legacy Node B can be one of the non-serving Node B:s. Hence, the RNC can apply an offset, which can either be positive or negative to the DPCCH SINR target used in all or sub-set of the cells in the non-serving Node Bs i.e. including the legacy Node B. A positive offset applied by the RNC at the non-serving Node B or subset of them means a higher SINR target whereas a negative offset means lower SINR target. For example a positive offset will ensure that the legacy Node B is able to decode the DPCCH from the LIE operating in UL MIMO or UL CL BFTD. On the other hand this will also ensure the data reception at the serving Node B. The latter stems from the fact that the non-serving Node Bs will not drive down the UE transmit power by sending too many down TPC commands; in soft handover the UE increases its transmit power only if all the received TPC commands are down.

A legacy Node B does not need to know which of the UE transmit antennas is transmitting DPCCH based on the legacy format when such a UE operates in an UL MIMO or UL CL BFTD mode. As long as any of the UE transmit antenna uses the legacy DPCCH, the legacy Node B can receive and decode the DPCCH signal.

An advantage with such embodiments is that all the radio links in the soft handover can be decoded at the new NodeBs and the legacy NodeBs when the UE operates in an UL MIMO or UL CL BFTD mode. This will ensure smooth transition during handover in several scenarios. Thus, any of the radio links in SHO including the one belonging to the legacy Node B can become the serving radio link. Furthermore, the UE operation may be changed by the RNC from soft handover to non-soft handover and in that case the new single radio link may belong to the legacy Node B.

UE Behavior of Handling Power Control Command

Since the cells of the active set belonging to legacy Node Bs cannot receive the data from a UE in an UL MIMO or UL CL BFTD mode correctly, the UE may have to ignore the UL Transmission Power Control (TPC) commands received from the cells of the active set belonging to legacy Node Bs. In accordance with some embodiments the RNC notifies a UE operating in UL MIMO or UL CL BFTD mode when each radio link is set up about the cells of the active set belonging to legacy Node Bs.

In accordance with some embodiments the UE is configured to detect whether the cell of the active set can support UL MIMO or UL CL BFTD or not. In this case, the UE configured to operate in UL MIMO or UL CL BFTD mode autonomously detects the TPCs from the cells of the active set in the legacy Node Bs from the missing UL MIMO or UL CL BFTD pre-coding vector indication information (informing the UE which pre-coding vector that it should apply on the uplink) and/or the missing of HARQ ACK/NACK feedback command or any information specific to the UL MIMO or UL CL BFTD sent over the downlink on the DL control channel to the UE.

In accordance with some embodiments a legacy non-serving Node B:s is configured to not transmit the UL TPC command to the UE when such a UE is configured to operate in MIMO or UL CL BFTD mode. This behavior of the Node B can be pre-defined or configured by the RNC. If this is configured in the RNC then the RNC configures the Node B when to not transmit the UL TPC commands. However, the UE behavior of ignoring the UL TPC command from a legacy Node B can still be implemented.

In accordance with some embodiments a default UE behavior of ignoring TPC commands from legacy Node B in soft handover can be pre-defined in the standard. The determination method whereby a UE determines that a radio link belongs to legacy Node B by missing UL MIMO or UL CL BFTD specific feedback information over the downlink control channel can also be pre-defined and included in a standard. These actions are entirely performed in the UE.

In accordance with some embodiments it can be specified that the RNC shall configure whether a UE in soft handover should ignore UL TPC commands sent over certain radio links or not. For example, in accordance with some embodiments in case the RNC expects that the UL TPC may not be reliable due to low UL SINR measured at the legacy Node B (e.g. in case the legacy Node B can only decode the DPCCH from one UE transmit antenna), the RNC can configure the UE to ignore UL TPC commands on the corresponding radio link. In this case signaling occurs between the RNC and the UE via RRC or between Node B and UE (e.g. signaling via lower layer such as by the physical channel Speed Shared Control Channel (HS-SCCH) or by the Medium Access Control (MAC) Protocol data Unit (PDU) etc.) to configure the UE.

Antenna Configuration while Serving Cell Transition

According to some embodiments, the RNC configures the UE to use a certain TX antenna mode which can be supported by both the target serving cell and original serving cell. This means that both the target serving cell and original serving cell should be able to receive both the uplink control and data channels with the configured TX antenna mode. For instance, before the serving cell is changed from a new Node B to a legacy Node B by the RNC, the RNC configures the UE to use the OLTD or default TX antenna mode or any suitable mode, which can be handled by a legacy Node B. Hence in this case the Tx antenna mode is changed from the UL MIMO or CLTD (if used prior to transition) to the legacy antenna mode during the serving cell change or during this transition of serving cell change. The changing of Tx antenna mode is performed by the RNC. Similarly if the serving cell and the target cell belong to the legacy Node B and the new Node B, the RNC still uses the legacy Tx antenna, which is supported by both serving and the target cells. This is to ensure a smooth and seamless handover. The most suitable Tx antenna scheme can be selected by the RNC after a successful transition of the serving cell by using any of the principles described above.

Embodiments described herein enable a smooth and seamless soft handover for an uplink multi-antenna transmission capable UEs in a deployment comprising a mixture of uplink multi-antenna transmission capable Node Bs and non-uplink multi-antenna transmission capable Node Bs. Also, the serving cell change from a cell belonging to a new Node B to a cell belonging to a legacy node B can be well handled, and the handover gain can be improved when there are cells in the active set of a UE belonging to legacy Node Bs and cells of the active set belonging to new Node Bs.

The invention claimed is:

1. A method in a radio network controller of a wideband code division multiple access (WCDMA) radio system, the radio system comprising a mixture of radio base stations of a first type that are capable of decoding transmissions in a first control channel format in an uplink multi-antenna transmission from a user equipment (UE) and radio base stations of a second type that are not capable of decoding transmissions in said first control channel format in an uplink multi-antenna transmission from the UE, the UE being connected to an active set of cells, the method comprising:

in response to an addition of a cell belonging to a radio base station of the second type to the active set of the UE, configuring uplink transmission of at least one transmit antenna of the UE to use a second control channel format that can be decoded by radio base stations of both the first and second types, wherein the uplink multi-antenna transmission is uplink (UL) Multiple-Input Multiple-Output (MIMO) or uplink Beam Forming Transmit Diversity (BFTD), and wherein the radio network controller configures a radio base station of the second type to not transmit UL Transmission Power Control (TPC) commands to a UE operating in UL MIMO or UL BLTD mode.

2. The method of claim 1, wherein the radio network controller notifies the UE when a radio link is set up about what cell or cells in the active set of the UE belong to a radio base station of the second type.

3. A radio network controller of a wideband code division multiple access (WCDMA) radio system, the radio system comprising a mixture of radio base stations of a first type that are capable of decoding transmissions in a first control channel format in an uplink multi-antenna transmission from a user equipment (UE) and radio base stations of a second type that are not capable of decoding transmissions in said first control channel format in an uplink multi-antenna transmission from the UE, the UE being connected to an active set of cells, the radio network controller comprising:

controller circuitry comprising a processor and associated memory, wherein the controller circuitry is adapted to configure uplink transmission of at least one transmit antenna of the UE to use a second control channel format that can be decoded by radio base stations of both the first and second types, in response to an addition of a cell belonging to a radio base station of the second type to the active set of the UE, wherein the uplink multi-antenna transmission is uplink (UL) Multiple-Input Multiple-Output (MIMO) or uplink Beam Forming Transmit Diversity (BFTD), and wherein the controller circuitry is adapted to configure a radio base station of the second type to not transmit UL Transmission Power Control (TPC) commands to a UE operating in UL MIMO or UL BFTD mode.

4. The radio network controller of claim 3, wherein the controller circuitry is adapted to notify the UE when a radio link is set up about what cell or cells in the active set of the UE belong to a radio base station of the second type.

5. The radio network controller of claim 3, wherein the control channel is a dedicated physical control channel.

* * * * *